May 21, 1968 S. POSTELSON-APOSTOLESCU 3,384,327
FLYING PLATFORM-AUTOMOBILE-BOAT AND AIR
SUSPENSION CAR COMBINATION
Original Filed Aug. 27, 1963 2 Sheets-Sheet 1
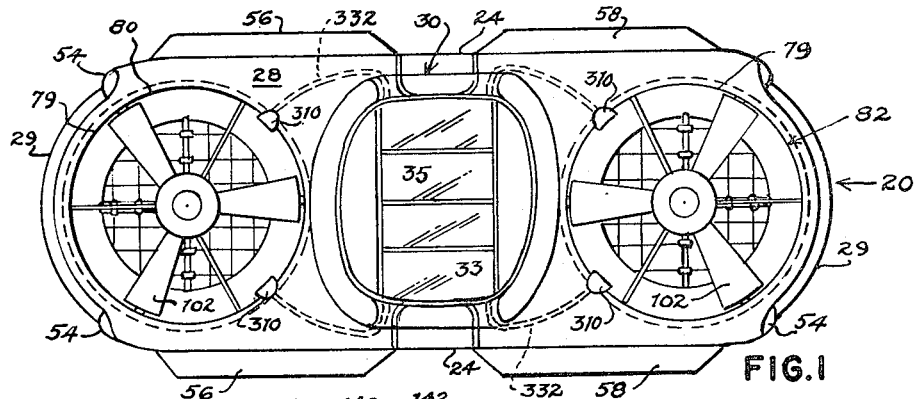
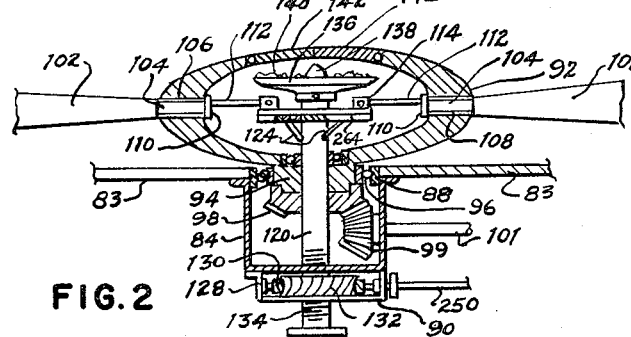
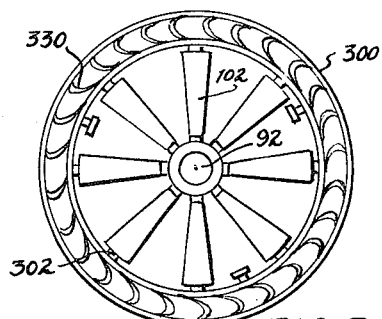
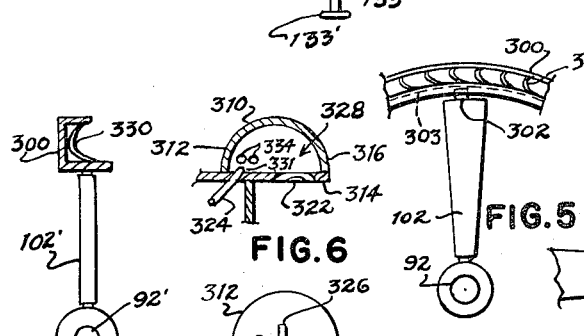
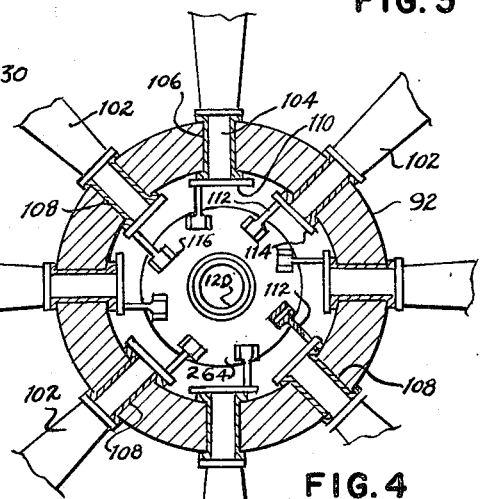
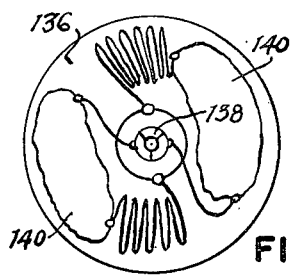
INVENTOR.
STEVEN POSTELSON APOSTOLESCU
BY Edw. S. Higgins
ATTORNEY May 21, 1968   S. POSTELSON-APOSTOLESCU   3,384,327
FLYING PLATFORM-AUTOMOBILE-BOAT AND AIR
SUSPENSION CAR COMBINATION
Original Filed Aug. 27, 1963                2 Sheets-Sheet 2
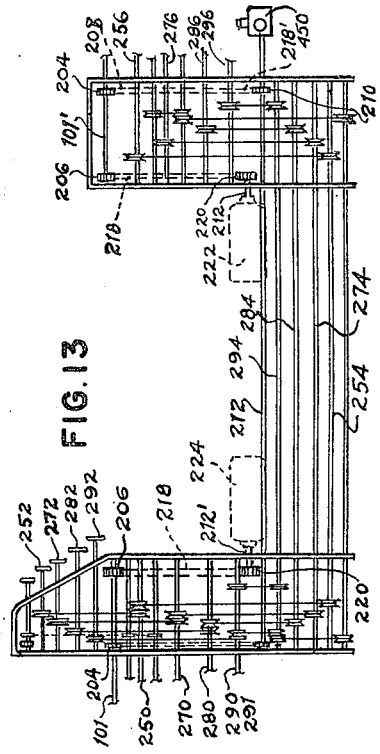
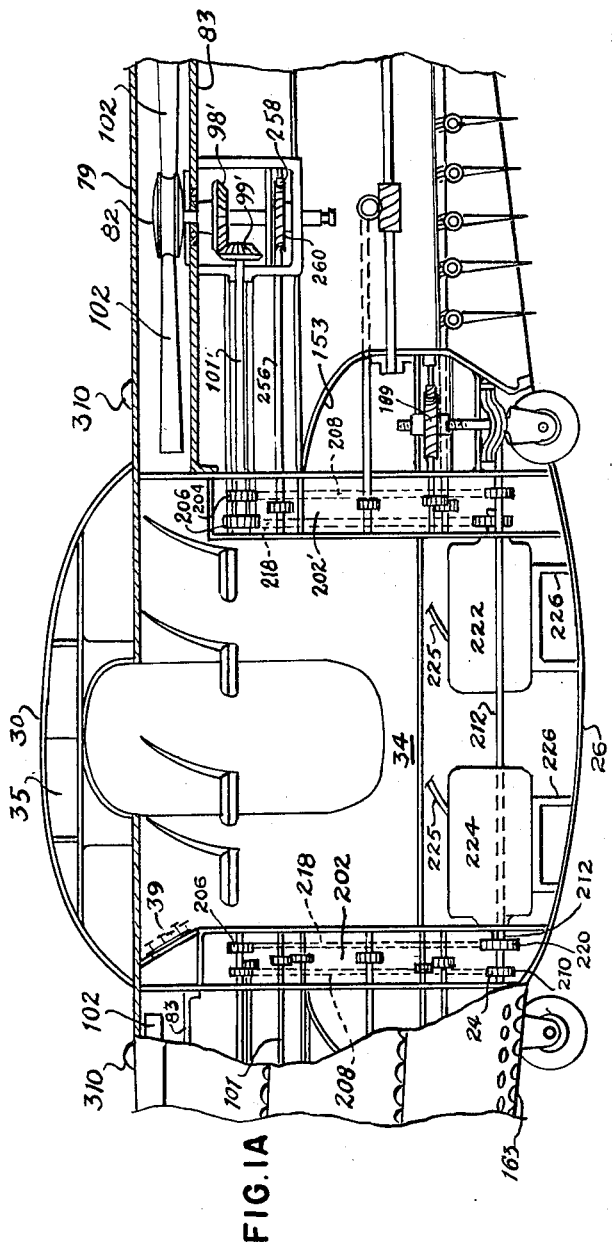
INVENTOR.
STEVEN POSTELSON-APOSTOLESCU
BY Edw. S. Higgins
ATTORNEY.

United States Patent Office 3,384,327
Patented May 21, 1968

3,384,327
FLYING PLATFORM-AUTOMOBILE-BOAT AND AIR SUSPENSION CAR COMBINATION
Steven Postelson-Apostolescu, 419 W. 35th St., New York, N.Y. 10001
Original application Aug. 27, 1963, Ser. No. 304,926, now Patent No. 3,265,329, dated Aug. 9, 1966. Divided and this application Oct. 21, 1965, Ser. No. 499,729
2 Claims. (Cl. 244—23)

ABSTRACT OF THE DISCLOSURE

Aircraft in the form of a combined flying platform-automobile-boat and air suspension car having a rotor assembly, the assembly including a hollow housing having a hub portion and spaced lateral openings. Blades are supported in the lateral openings and radiate from the housing. Means is provided for changing the pitch of the blades, said means including a tubular member, a roll cam plate mounted on the tubular member, arms carried by the blades turnable on said cam plate and means to raise the tubular member with the roll cam plate to raise the blade arms that tilt the blades at any desired angle to control the flight of the aircraft in the air.

This invention relates generally to aircraft and more particularly to a combination aircraft and land vehicle and this application is a division of my copending application filed Aug. 27, 1963, Ser. No. 304,926, now Patent No. 3,265,329, granted Aug. 9, 1966. The invention relates generally to aircraft which may travel through the air or travel upon a highway with equal facility wherein the operator of the vehicle may be provided with selective controls for guiding the movement, speed and direction of the vehicle under all conditions.

An important object of the present invention is to provide a vehicle of this kind that operates upon a new principle of propulsion, involving a ring-like turbine engaged at the tip ends of the rotor blades. The ring-like turbine turning with the rotors wherein the gases from the rocket engines force the ring-like turbine to turn at high speed revolution, thereby insuring continuous operation of the rotors under all conditions or emergencies, thus greatly increasing the safety of the vehicle and its passengers.

The invention may take the form of an airship, flying platform, automobile, boat or air suspension car.

The invention contemplates a vehicle that is compact and capable of flying with great facility and great speed and provided with great lifting power, in any medium, such as air, land and/or water, and readily, and automatically convertible from one use to another, without loss of time or necessity of getting out of the vehicle.

Yet another object of the invention is to provide a vehicle of this type with parachutes in its rotor heads and at the top center of the body of the vehicle, which parachutes are adapted to be ejected automatically, under all conditions or when the engines have stopped operating, permitting a safe landing.

Still another object of the invention is to provide a vehicle of this type that is capable of traveling in any medium such as air, land, water, ice or snow, suspended on air cushion thereby permitting the vehicle to carry heavy loads close to the ground and silently, at great speeds for very long ranges, so as to avoid risk of being seen or heard for certain military and civilian purposes.

Still another object is to provide an airship that is capable of great lifting power, great speed or velocity and that can climb readily into space and that is capable of great maneuverability.

Other objects and advantages of the invention will be apparent from the description thereof to follow taken in connection with the accompanying drawings wherein:

FIG. 1 is a top plan view of an aircraft embodying my invention.

FIG. 1A is a fragmentary side elevational view thereof.

FIG. 2 is a sectional view through the center of a rotor assembly.

FIG. 3 is a top plan view of the rotor, blades and ring-like turbine assembly.

FIG. 4 is a part plan and part cross-sectional view of FIG. 2 above the blades.

FIG. 5 is a top plan view of a blade mounting of the form of FIG. 3.

FIG. 6 is a sectional view of the rocket engine shown in FIG. 10.

FIG. 7 is an edge view of the assembly of FIG. 3.

FIG. 8 is a plan view of the rocket engine shown in FIG. 3.

FIG. 9 is a central sectional view of the rocket engine shown in FIGS. 3 and 8.

FIG. 10 is a side elevational view thereof.

FIG. 11 is a side elevational view of a detail of the rotor assembly.

FIG. 12 is a plan view of the parachute assembly.

FIG. 13 is a fragmentary detail view of the gear box.

Referring more in detail to the drawings, in FIG 1 there is shown an aircraft designated generally at 20 embodying my invention. The aircraft comprises an elongated fuselage or body including side, top and end walls, 24, 28 and 29, repectively. An opening in the center of the top wall 28 is closed by a dome-shaped structure 30. A chemical fuel compartment 33 is provided at each side at the top compartment 35 at the center. Lamps 54 are shown at the ends of the fuselage.

In each side wall 24, 24, as wing structure 56 is provided at the front of the fuselage and a wing structure 58 at the rear thereof.

In the front and rear sections of the fuselage, below the openings 79 in the top wall 28, there are rotor assemblies 80 and 82 supported on horizontal members 83. The rotor assemblies are similar in construction and each includes as best shown in FIG. 2 a U-shaped casing 84 open at the top and depending from supporting member 83 under an opening 88 therein. A pan 90 is secured to the bottom of the casing 84. A hollow bulbous shaped housing 92 having a hub portion 94 is rotatably supported in the opening 88 in the supporting member 83 on ball bearings 96. A gear 98 is fixed on the bottom end of the hub portion 94 which meshes with a pinion 99 on a drive shaft 101. Turning movement of the shaft 101 is imparted to the housing 92. A plurality of blades 102 is carried around with the housing 92. Each blade has a hub portion or extension 104 extending through bushing 106 in radial openings 108 in the housing 92. Discs 110 are formed on the inner ends of the hub portions 104 to which is attached one end of an arm 112 offset from the center of the disc. The other end of the arm is attached to a bracket 114 on the top part of a circular roll cam plate 264 having a central opening and fixed around the tubular member 120 by brackets 124, which tubular member 120 extends upwardly through aligned openings in the pan 90 and casing 84. The circular roll cam plate 264 is affixed to and supported on the tubular member 120 by the bracket 124.

Means is provided for changing the pitch of the blades 102 including a shaft 250 extending from the pilot's chamber and extending through an opening in the pan 90. The inner end of the shaft is journalled in opposed bearings 128 on the inner surface of the side wall of the pan and formed on the shaft inside the pan there is a worm 130 turning with the shaft. Worm 130 meshes with a worm gear 132 which in turn meshes with external threads 134 on the outer surface of the tubular member 120. By turning shaft 126, the tubular member 120 may be moved up and down thereby moving the roll cam plate 264 up and down to tilt the blades 102 through arms 112 and thereby change the pitch of the blades thereof. The lower part of the roll cam plate 264 rests fixedly on the tube 120 and does not turn, the upper part of the cam roll plate on which the arms of the blades 102 are engaged on bracket 114 turn together with the blades 102 and rotor hub 82.

A dished shaped plate 136 is fixed on the top end of the tubular member 120 and supported on said plate 136 there is a rocket 138. A parachute 140 in folded condition is also supported on the plate 136 with one end operatively attached to the rocket 138 at one end and to the plate 136 at the other end. Above the plate 136, the housing 92 has an opening which is closed by hinged doors 142, 142. A rod is slidably connected through tube 120 to the rocket 138 on the plate 136—the rod 133 has a handle 133'; when the handle 133' is pulled down the rocket will automatically be activated and will force up the parachutes 140, 140 through doors 142, 142. This way permits a safe landing in any emergency.

The actuation and operation of the rotor 80 and 82 will now be described. Each rotor is driven by the shaft 101 which extends into and across the control chamber 202. A pair of spaced gears 204 and 206 is fixed on the shaft 101 inside the chamber 202. A chain 208 is trained around the gear 204 on shaft 101 and around a gear 210 in chamber 202 on shaft 212 which extends from front to rear of the fuselage and through chamber 202' into the gear box 450. Another chain 218 is trained around the gear 206 on shaft 101 and around a gear 220 fixed on the drive shaft of either engine 222 or 224 mounted on a bracket 226 on the center bottom wall 26. This arrangement permits the driving of the rotors by the two engines or by only a single engine at the same time. The shaft 212 extends from the front control chamber 202 to the rear control chamber 202' and goes farther in the rear into the gear box 450. The gear box 450 is driven constantly but is not connected when in flight; only when on the road and operating as an automobile, the shaft 212 is automatically connected to drive the gear box and its shaft and driving wheels.

With particular reference to FIGS. 1A and 13, the control system for the rotors will now be described. The controls are located in the central compartment 34. The front rotor 80 is driven by engine 224 through drive shaft 212' gear 220, chain 219, gear 206, shaft 101, pinion 99 and gear 98.

The rotor 82 at the rear is driven by engine 222 through engine drive shaft 212', gear 220 on shaft 212', chain 218, gear 206, shaft 101', pinion 99' and gear 98'. Fuel supply pipes 225 lead to the engine 224 and 222. When engines 224, 222 turn the rotors will turn and if one engine stops the other engine will drive the rotors 80, 82 through shaft 212'.

Shaft 250 in the front rotor control chamber 202 has two pulleys, one of which is connected by wire or chain to pulley on shaft 252 in the pilot control board 39; the other pulley being connected by a chain to a pulley on shaft 254. Shaft 254 extends to chamber 202' in the rear rotor system where it is connected by a pulley and wire to shaft 256 in the rear control chamber 202'. Shaft 256, through worm 258 and gear 260 controls the raising or lowering of the tube 120 which controls through its roll cam plate 264 the variable pitch of blades 102 on rotors 82 and 80.

Shaft 270 which extends from the front rotor to control chamber 202 has two pulleys, one of which is connected by wire or a chain to a pulley on shaft 272 on the pilot's control board; the other pulley being connected by wire or a chain to a pulley on shaft 274. Shaft 274 extends to the rear control chamber 202' in the rear rotor system 82 and by means of pulley or chain is connected to a pulley on a shaft 276 in the rear control chamber 202'. When shaft 272 in front chamber 202 is turned, shaft 270 is turned which turns shafts 274 and shaft 276 which control the fins not shown.

Shaft 280 in chamber 202 of front rotor system has two pulleys on the control chamber 202, one of which is connected by wire or a chain to a pulley on shaft 282 on pilot's control board; the other of which is connected by wire or chain to a pulley on shaft 284 in the front control chamber 202. Shaft 284 extends to the chamber 202' in the rear rotor system where it is connected by a pulley or chain to a pulley on shaft 286 in the rear chamber 202'. Shaft 286 controls the raising and lowering of the landing gear system.

Shaft 290 in the front chamber has two pulleys, one of which is connected by a wire to a pulley on shaft 292 on the pilot's control board; the other of which is connected by a wire to a pulley on a lower shaft 294 in the front control chamber 202. Shaft 294 extends to the control chamber 202 in the rear rotor system where it is connected by a pulley and wire to a pulley on shaft 296 in the rear control chamber 202'. Shaft 296 controls the fins (not shown) for raising the airship and for the propulsion of the airship in the air and its flight direction, up, forward and backward.

Around the openings 79 in the top wall 28, rocket engines 310, two being shown at each opening, are supported. Each rocket engine 310 as shown in FIGS. 6 and 8 consists of a hollow semi-spherical shell 312, with a bottom wall 314 and side wall 316. Fuel inlet pipes 318 and 320 enter through openings 334 in the side wall. An exhaust opening 322 is formed in the bottom wall 314. An exhaust pipe 324 leads out through the bottom wall. A wall 326 depends down from the bottom wall 314. The bottom and side walls define an explosion chamber 328 and when liquid chemical fuel is introduced into the chamber 328 an explosion occurs and the compressed gas from the chamber 328 will be forced at an angle through opening 322 against the teeth 330 of the turbine ring 300. The blades 102 have pins 302 at their outer ends riding in grooves 303 in the ring 300. The engines 310 are supplied with fuel from supply tanks through pipes 332. (see FIG. 1). The extra exhaust opening 331 in the bottom of the engines 310 lead to pipe 324 and can be closed or opened to divert the gases in other directions of the aircraft fuselage.

In operation, when the vehicle is on the ground, the rotor blades are kept on an inactive angle. The rotors are so connected to the engines and to each other by shafts and controls to such an extent that the craft can be instantly converted to an automobile type vehicle to be driven on the land such as a highway; or to be converted to a water craft or to an airship for flying through the air or to a craft using air suspension principle over the land and water.

While I have illustrated and described the preferred embodiment of my invention, it is to be understood that I do not limit myself to the precise construction herein disclosed and the right is reserved to all changes and modifications coming within the scope of the invention as defined in the appended claims.

I claim:

1. In an aircraft of the kind described, a rotor assembly including a hollow housing having a tubular hub portion, said housing having spaced lateral openings, a threaded tubular shaft member extending through the hub into the interior of the rotor housing, a lower part of a roll cam plate supported on the tubular shaft member in the rotor housing, at the top thereof an upper part of the roll cam plate supported on said tube, blades supported on said lateral openings and radiating from the housing, each blade having a hub portion extending through the respective lateral opening, a disc on the inner end of each last named hub portion, an arm radiating from said disc spaced from the center thereof, the other end of the arm blade being turnably mounted on brackets on the upper part of the roll cam plate, said roll cam plate lower part being secured by bracket on the tubular shaft and does not turn with the rotor housing and blades, said upper part of the roll cam plate turning along with the rotor housing and blades and a ring turbine, a turbine ring around the outer ends of the radiating blades, pins projecting from the outer tip ends of the blades, said ring having grooves therealong, said pins mounted in said grooves for securing the ring on the blades, stationary rocket engines on the top of a fuselage and on the top of the ring turbine to turn said ring turbine with the blades and rotor housing, for operational purposes or for emergency landing.

2. In an aircraft of the kind described, a rotor assembly including a hollow housing having a tubular hub portion, said housing having spaced lateral openings, and an opening in the top thereof, blades supported in said lateral openings and radiating from the housing, hinged doors closing the opening in the top, means for changing the pitch of the blades including a non-rotatable threaded tube member extending through the hub into the interior of the rotor housing, ball bearings in the top of the hub portion to isolate the tube member of friction, a roll cam plate mounted on the tube member, the lower part of the roll cam plate being stationary, the top part of the roll cam plate being turnable, said top part of the roll cam plate having brackets, arms from the blades turnable on said top part, means to raise said tube member with the roll cam plate to raise the blade arms that tilt the blades at any desired angle to control the flight of the aircraft in air, the means for changing the pitch of the blades including further a worm gear having a threaded central opening sleeved around the tube member, a rotatable shaft extending at right angles to the worm gear, a worm gear carried by said rotatable shaft in mesh with said gear, means for rotating said other rotatable shaft to raise or lower the tube member, the means for rotating said rotatable shaft including a longitudinal shaft extending from the worm gear to a control chamber, two pulleys on said shaft in the control chamber, one pulley connected by a wire to a pulley on a shaft on a pilot control board, the other pulley connected by wire to a pulley on a shaft on the bottom of a fuselage, said shaft extending to a rear control chamber, a pulley on that part of the bottom shaft connected by a wire to a pulley on a shaft in the rear control chamber, said shaft extending rearwardly to a rear rotor, a worm gear on the end of the shaft in mesh with the threaded worm gear that raises or lowers the threaded tube member with the roll cam plate on which the blade arms are mounted that permit the variable pitch of the blades for flight and control of the aircraft in air.

References Cited

UNITED STATES PATENTS

| 2,494,209 | 1/1950 | Sikorsky | 170—135.7 |
| 2,749,994 | 6/1956 | Apostolescu | 170—135.2 |

FOREIGN PATENTS 647,532  12/1950  Great Britain.

MILTON BUCHLER, *Primary Examiner.*

R. A. DORNON, *Assistant Examiner.*